April 11, 1950     S. A. CROWE     2,503,547
REMINDER SLIDE FOR FILM-PACK ADAPTERS
Filed June 2, 1947
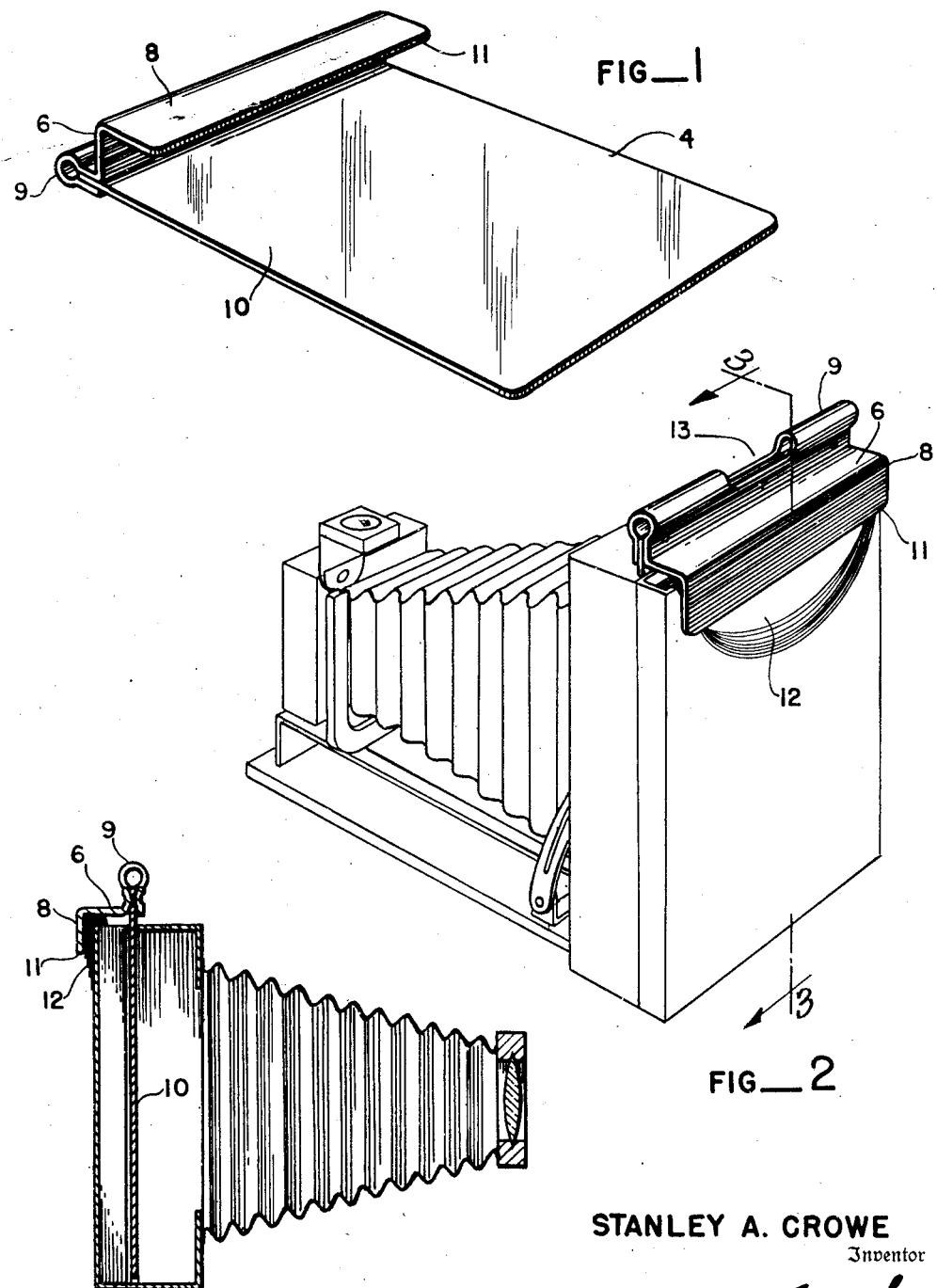
STANLEY A. CROWE
Inventor
By Smith & Tuck
Attorneys Patented Apr. 11, 1950

2,503,547

UNITED STATES PATENT OFFICE 2,503,547

REMINDER SLIDE FOR FILM-PACK ADAPTERS

Stanley A. Crowe, Seattle, Wash.

Application June 2, 1947, Serial No. 751,861

5 Claims. (Cl. 95—67)

My present invention relates to the art of photographic equipment and, more particularly to a reminder slide for film-pack adapters.

For many forms of photography it is found desirable to use film that is packaged for use in a film pack. This general arrangement usually provides twelve pieces of cut film of the size proper for the intended exposure, as employed with some particular type of camera, and the film is so arranged that normally twelve cut films are packaged together. Each film has a backing strip and this is normally extended, or a separate pulling tab is provided, so that as soon as one film has been exposed, the photographer may pull out and tear off the numbered film tab and, by so doing, he has removed the exposed film from its position on the lens side of the film pack to a position in the rear of the unexposed film.

Most expensive cameras, and certain of the reflecting cameras, are normally intended for use with plates or cut films or film packs. When the film pack is used, it is normally employed in such cameras by being placed in a light-proof casing or adapter, which has a removable dark slide, normally disposed between the unexposed film and the camera lens. To make an exposure, therefore, the photographer must withdraw the dark slide, so that the unexposed film which, up to that time and for purposes of handling, is protected by the dark slide, can be presented for exposure. For each succeeding exposure the film tab must be withdrawn, normally torn off, so as to present fresh film for exposure.

Probably the principal type of cameras in which film packs are used now-a-days is the so-called press-type of extension bellows camera. These cameras are used for covering the various news events and quite generally by press photographers and others interested in photography on a commercial or professional scale.

It is under such conditions, where a photographer has a limited period in which to take his pictures, which if not secured may be gone forever, that my reminder or protective slide has proved to be of great value. Too often a photographer carrying his camera with the dark slide in place will go through the normal routine of taking a series of pictures and then, because of the stress under which he may be working, whether it is an accident, or a fleeting subject of interest, or during times of danger, it has been found that all too frequently when the film is developed the photographer has forgotten to remove his film pack slide and therefore no exposure has actually been made.

My present invention is so arranged that it is impossible for a photographer to pull successive tabs from a film pack until he has first removed the dark slide, as an extension of the slide, forming the handle, so covers or contains the outwardly extending tabs that he cannot withdraw them without having the physical obstruction of the slide to overcome.

The principal object of my present invention, therefore, is to provide a protective, or reminder, dark slide for film pack adapters which will make it impossible for the user of the film pack to pull the successive film pack tabs without first removing the dark slide.

A further object of my invention is to provide an extension of the film pack slide so arranged that it covers the outwardly projecting film tabs in such a way that the tabs cannot be removed without removing the slide.

A further object of my present invention is to form as an extension of the slide a U-shaped covering member which will extend outwardly and over the film tabs so as to protect the film from damage of from the entrance of dust or rain.

Further objects, advantages and capabilities will be apparent from the description and disclosure in the drawings, or may be comprehended or are inherent in the device.

In the drawings:

Fig. 1 is a perspective view showing a film pack dark slide made after the teaching of my present invention.

Fig. 2 is a perspective view of a camera showing a film pack adapter in position thereon, with the slide in place showing how it protects the ends of the film tabs.

Fig. 3 is a cross-sectional view in elevation showing somewhat diagrammatically a bellows type camera and the manner in which my film pack slide protects the outwardly extending tabs of the film pack.

Referring more particularly to the disclosure in the drawings, the numeral 4 designates generally my improved reminder dark slide. Such slides are of necessity made of opaque material. They may be, as formerly, of hard rubber or some of the plastic materials or probably most practically they should be formed of sheet metal which is finished with a black finish, preferably. In any event, that portion of the slide which enters and seats within the usual slide slot in the film pack adapter must conform to the dimensions required of such slides.

The novel portion of my slide is in the exposed end of the same, in which I have a portion which is normally referred to as the top portion 6. Joined to top portion 6 is a back cover portion 8, which is preferably formed to be parallel to the main body 10 of slide 4.

It will be apparent that my slide may be formed as a single piece. However, an economical and usable construction is shown throughout my drawings where my shield members 6 and 8 are formed as a separate unit, with the handle portion 9, and then secured to a sheet of slide material 10. This permits of easy manufacture and the selection of material most workable or suitable for the respective service. I have shown the rolled finger grip or handle portion 9 as being cut out at 13. This structure is often used for the insertion of a bail or locking device.

Referring to Figs. 2 and 3, it will be noted that the spacing between the main body portion 10 and the parallel member 8 should be sufficient so that the film tabs 12 will be closely engaged. This will serve to secure the slide in its fully inserted position, it will also fully protect the tabs and the slot that normally is at the top of the camera against the entrance of foreign materials or water, and finally, it so fully encloses the tabs that it is impossible for a person to pull one of the tabs when attempting to take a picture without first removing the slide.

It may appear to the uninitiated that this is an unnecessary precaution. However, the embarrassing experiences of most photographers who use film packs, indicate clearly that there is a real need for a reminder or protective device of this order. Under the conditions of stress and excitement which are so common to the work of a commercial photographer, he must at the same time calculate his aperture, light and speed of exposure, and then too, he is so often photographing subjects who are not posing for a picture but who must be taken "on the run" so to speak. This requires very close attention to focusing and, as most of these cameras are equipped with range finding devices that require the full attention of the operator's eye, it is easy for him to neglect to pull the dark slide with the conventional film pack and slide arrangement.

With my present protective slide, it will be noted particularly in Fig. 2, that the film tabs still extend downwardly below edge 11. However, any attempt to pull the film tab while the slide is gripping the tabs will mean that he must pull it around a sharp corner, where the various tabs are rather tightly pressed together. Such an arrangement results in a snubbing action so great that trial has proved that the paper of the tabs that extend out from the film pack will be torn apart before sufficient force can be applied to the film to move it from its normal position.

In forming the protective cover arrangement, composed of parts 6 and 8, it has been found that the material from which the parts are made should be resilient or flexible to a degree, so that the edge 11 will be pressed in snugly against the film pack, even though a number of the tabs have been pulled and discarded. This snugness of fit also insures that the device may be used in the cases now used to carry cameras and pack adapters, without modification of the device.

It is believed that it will be apparent from the above description and disclosure in the drawings, that the invention comprehends a novel construction of a reminder slide for film pack adapters.

Having thus described my invention, I claim:

1. A reminder slide for film pack adapters, comprising: a sheet of opaque material formed as a safety slide for the film pack; a handle for said slide, and aligned therewith; a rearwardly extending resilient top cover portion secured to said handle; and a resilient back cover portion secured to said top cover portion and disposed in a plane parallel to said slide.

2. A reminder slide for film pack adapters, comprising: a sheet of opaque material formed as a safety slide for the film pack; a handle for said slide and aligned therewith; a top cover portion formed as part of said handle and extending outwardly normal thereto; and a back cover portion formed as a continuation of said top cover portion and formed as a plane parallel to said slide and spaced therefrom to insure pressure on the film tabs of said film pack.

3. A reminder slide for film pack adapters having exterior film tabs, comprising: a sheet of opaque composition material formed as a safety slide for the film pack; a separately formed handle for said slide, aligned therewith and fixedly secured to said slide; a top cover portion secured to said handle; and a back cover portion secured to said top cover portion and adapted to press on said film tabs.

4. A reminder slide for film pack adapters, comprising: a sheet of non-metallic opaque material formed as a safety slide for the film pack; a sheet metal handle for said slide, aligned therewith and extending to each side margin of said slide; a resilient top cover portion secured to said handle; and a resilient back cover portion formed as a continuation of said top cover portion and adapted to lie substantially parallel to and press on the film tabs of said film pack.

5. A reminder slide for film pack adapters for use with films having exterior film tabs, comprising: a sheet of opaque material formed as a safety slide for the film pack; an exterior gripping portion of said slide, aligned therewith; a top cover portion secured to said handle; and a flat back cover portion secured to said top cover portion, adapted to press against said film tabs.

STANLEY A. CROWE.

REFERENCES CITED

The following references are of record in the file of this patent:

UNITED STATES PATENTS

| Number | Name | Date |
|--------|------|------|
| 874,644 | Torrani | Dec. 24, 1907 |
| 1,616,906 | Kroedel | Feb. 8, 1927 |